US007818232B1

(12) United States Patent
Mead et al.

(10) Patent No.: US 7,818,232 B1
(45) Date of Patent: Oct. 19, 2010

(54) SYSTEM AND METHOD FOR PROVIDING AUTOMATED INVESTMENT ALERTS FROM MULTIPLE DATA SOURCES

(75) Inventors: Jennifer Ruth Mead, Bellevue, WA (US); Eric K. Zinda, Seattle, WA (US); Daniel J. Fisher, Woodinville, WA (US); Malti Raghavan, Redmond, WA (US); James Jubak, New York, NY (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/255,737

(22) Filed: Feb. 23, 1999

(51) Int. Cl.
*G06Q 40/00* (2006.01)
(52) U.S. Cl. ................................. 705/36 R; 705/35
(58) Field of Classification Search .............. 705/35, 705/37, 36 R, 36 T; 340/825.26, 825.27
See application file for complete search history.

(56) References Cited

U.S. PATENT DOCUMENTS

| | | | | |
|---|---|---|---|---|
| 4,554,418 A | * | 11/1985 | Toy ..................... | 340/825.27 X |
| 5,426,422 A | * | 6/1995 | Vanden Heuvel et al. ..................... | 340/825.27 |
| 5,761,442 A | * | 6/1998 | Barr et al. ..................... | 395/236 |
| 6,088,707 A | * | 7/2000 | Bates et al. ................. | 707/501 |
| 6,094,681 A | * | 7/2000 | Shaffer et al. ............... | 709/224 |
| 6,188,992 B1 | * | 2/2001 | French ......................... | 705/35 |
| 6,192,364 B1 | * | 2/2001 | Baclawski ................... | 707/10 |
| 6,219,694 B1 | * | 4/2001 | Lazaridis et al. ............ | 709/206 |

FOREIGN PATENT DOCUMENTS

| | | | | |
|---|---|---|---|---|
| CA | 2122116 | A | * | 12/1994 |
| TW | 508517 | A | * | 11/2002 |
| TW | 518473 | A | * | 1/2003 |
| TW | 542984 | A | * | 7/2003 |
| TW | 561372 | A | * | 11/2003 |

OTHER PUBLICATIONS

Resnick, Rosalind, "Serial portfolio", Dec. 1992, Compute, v14, n11, p. 90 (4).*
Schroeder, Mary, "On-line Brokerage Industry Takes Off", Jan. 4, 1999, Securities Data Publishing.*
Steinhart, David, "E-trading volumes gather steam . . . ", Dec. 29, 1998, Financial Post, p. 01.*

(Continued)

*Primary Examiner*—Kelly Campen

(57) ABSTRACT

A system and method provides investors with meaningful information extracted from large volumes of available data for a particular stock, mutual fund, bond, or other investment. The system includes one or more computers that receive and process multiple data feeds to extract information relating to each type of investment. The processed data is compared to "alert rules" each corresponding to a predefined condition, and a truth table is established that identifies alerts that are true for each particular investment. An investor logs onto a web site and enters a stock ticker symbol or similar investment identifier. Computer software displays a web page including "alerts" that are presently true for that particular investment. The alerts can be predefined by financial experts to make them useful to novice investors. When an investor selects a particular investment, a display is generated showing all of the alerts that are true for that investment and allowing the user to get more information concerning the significance of the alerts. The alerts can be grouped into different categories according to their content or time sensitivity.

2 Claims, 10 Drawing Sheets

OTHER PUBLICATIONS

Ferguson, Tim, "Do it yourself", Apr. 22, 1996, Forbes, v157n8, pp. 70-80.*

"Stock of the Week: E*Trade Group Inc.", Nov. 16, 1998, The Sacromento Bee, p. IB.8.*

Schroeder, Mary, "E*Trade Rolls Out Destination E*Trade . . .", Jun. 29, 1998, Securities Data Publishing.*

"E*Trades New Destination Financial Services Web Site Attracts . . .", Dec. 28, 1998, PR Newswire, p. 9800.*

Stone, Amey, "All-in-one accounts look even more appetizing", Oct. 31, 1994, Business Week, n3396, pp. 130-131.*

"Schwab to Launch E-Mail Alert System", Dec. 21, 1998, Financial NetNews, v III, n 51, p. 1+.*

Herman, Tom, "On Your Own—Does it Compute? . . .", Nov. 30, 1998, Wall Street Journal, pR, 21:1.*

"Boston Equity, Research Group, Inc. Announces the Availability of their Research Program through First Call Research Direct", Oct. 15, 1997, PR Newswire, p1015NEW024.*

"E*Trade Home", Retrieved from: http://web.archive.org/web/19990209072059/www.etrade.com/cgi-bin/gx.cgi/AppLogic+Home (Mar. 3, 2010), (Feb. 8, 1999), 1 page.

"E*Trade Welcome to the Smarter way to Invest", Retrieved from: http://web.archive.org/web/19970409110234/http://www.etrade.com/ (Mar. 3, 2010), (Apr. 9, 1997), 2 pages.

* cited by examiner

802 ← 801

Quotes delayed at least 20 minutes.

| FYI | News | Symbol | Name | Last | Change | % Change | Volume |
|---|---|---|---|---|---|---|---|
| *fyi* | | MSFT | Microsoft Corporation | 138 1/2 | +6 | +4.53% | 14,460,300 |
| *fyi* | | DELL | Dell Computer Corporation | 100 | +3 | +3.09% | 4,907,400 |

Today's Featured Article:
Invest in your knowledge of mutual funds

| Trigger | ShortName | ActiveMessage | Calculation |
|---|---|---|---|
| 0 | Near Low With Positive Momentum | The price of %Symbol% has been within 20% of its 52-week low with a positive price momentum. This is usually considered to be a bullish indicator since it means that bargain hunters are buying it and pushing the price back up. | Last within .2 * 52 week low AND On Balance Volume > 100 AND 1-week % Price change > 1 AND 1-month price change > 1. |
| 1 | Stock Split Announcement | %Symbol% announced that its stock will split %split ratio% on %date%. | fire this trigger when a split announcement is received |
| 2 | Earnings Release Date Set | It was reported that %Symbol% will announce its earnings on %date%. | fire this trigger when earnings release date is received |
| 3 | Analyst Recommendation Changed | %Symbol% was %Rating changed%. | fire this trigger when upgrade or downgrade report is received |
| 4 | New 52-Week High | %Symbol% reached a new 52-week high. | Previous [52 Week High] < [52 Week High] |
| 5 | New 52-Week Low | %Symbol% reached a new 52-week low. | Previous [52 Week Low] > [52 Week Low] |
| 6 | Earnings Estimate Increased | It was reported that the current quarter mean earnings estimate for %Symbol% increased. | Last Current Quarter Mean Estimate < Current quarter mean estimate |
| 7 | Earnings Estimate Decreased | It was reported that the current quarter mean earnings estimate for %Symbol% decreased. | Last Current Quarter Mean Estimate > latest Current quarter mean estimate |

FIG. 9A

| | | | |
|---|---|---|---|
| 8 | Earnings Estimate Spread Increased | It was reported that the spread between the high and low earnings estimate for %Symbol% has increased by 20% or more. Such an increase is generally considered to signal increasing uncertainty about the stock's prospects. | (Highest Estimate of Next Year's Earnings in latest data drop - Lowest estimate of next year's earnings in latest data drop) > 1.2 x (Highest estimate of next year's earnings in previous data drop - lowest estimate of next year's earnings in previous data drop). Note: need to handle case where numbers are negative. |
| 9 | Earnings Estimate Spread Decreased | It was reported that the spread between the high and low earnings estimate for %Symbol% has decreased by 20% or more. Such a decrease is generally considered to signal increasing certainty about the stock's prospects. | (Highest Estimate of Next Year's Earnings in latest data drop - Lowest estimate of next year's earnings in latest data drop) < .8 x (Highest estimate of next year's earnings in previous data drop - lowest estimate of next year's earnings in previous data drop) |
| 10 | Annual Revenue Growth Above 5-Yr Average | Analysis of the latest ANNUAL financial results for %Symbol% showed that revenue growth has increased by at least 20% more than the five-year average revenue growth. | [Rev Growth annual vs. annual] > 1.20 * [5 year rev growth]. Note: negative numbers must be handled. |
| 11 | Annual Revenue Growth Below 5-Yr Average | Analysis of the latest ANNUAL financial results for %Symbol% showed that revenue growth is at least 10% less than the five-year average revenue growth. | [rev growth annual vs annual] < .90 * [5 yr rev growth]. Note: must handle negative numbers. |
| 12 | Annual Earnings Growth Above 5-Yr Average | Analysis of the latest ANNUAL financial results for %Symbol% showed that earnings growth was at least 20% greater than the five-year average earnings growth. | [Inc Growth Annual vs Annual] > 1.2 * [5 yr Earnings Growth]. |

FIG. 9B

SYSTEM AND METHOD FOR PROVIDING AUTOMATED INVESTMENT ALERTS FROM MULTIPLE DATA SOURCES

TECHNICAL FIELD

This invention relates generally to computer-implemented investment planning and monitoring methods. More particularly, the invention provides a way of identifying and extracting meaningful investment-related information from multiple data feeds and providing it in a user-friendly fashion to investors.

BACKGROUND OF THE INVENTION

Various companies have for many years provided investment information so that investors can make informed investment decisions. Such information may include analyses of a company's share prices, price-to-earnings ratios (P/E), stock splits, profits, and the like on a yearly, quarterly or monthly basis. Investors typically receive such information in printed form by subscribing to one or more publications that contain information for a large number of companies. One disadvantage of these conventional approaches is that novice investors may not comprehend the many financial quantities reported for corporations or other investments, and they may have to pore over a large quantity of information compiled for all subscribers in order to identify information for one investment of interest.

More recently, the wide availability and use of computers by consumers has spawned new frontiers in the investment information field. Companies such as E*TRADE™ and others provide investment information to consumers on-line and in a more rapid fashion. Investors can subscribe to such services by paying a monthly fee to access databases of information regarding stocks, bonds, mutual funds and the like. In some cases, investors can arrange to be notified via e-mail when certain quantitative information matches a user-specified criterion. For example, an investor can now be notified via e-mail when the share price in a company of interest reaches a user-specified target price.

At the same time that investment information has become more accessible to ordinary consumers, the proliferation of investments, quantitative information (e.g., P/E ratios), and non-quantitative information (e.g., news reports) concerning those investments has complicated investment decisions for unsophisticated or novice investors. For example, a novice investor may have no idea what parameters would be important to track for a particular purpose, and may not appreciate what time period would be appropriate for tracking those parameters (e.g., quarterly, yearly, semi-annually, etc.).

Novice investors may have no way to correlate the quantitative information with other information such as news stories, financial analyst recommendations, and credit ratings. The proliferation of mutual funds in different market sectors, geographic regions, and other categories further complicates the investment decisions of the novice investor. In short, the volume of investment information can overwhelm ordinary investors, making it difficult to select investments without enlisting the personalized advice of a financial planner.

SUMMARY OF THE INVENTION

The present invention overcomes many of the foregoing problems by providing ordinary investors with meaningful information extracted from the large volume of available data for a particular stock, mutual fund, bond, or other investment. An investor logs on to a web site and enters a stock ticker symbol or similar investment identifier (e.g., MSFT for Microsoft). Computer software displays web pages including "alerts" that are presently true for that particular investment. The alerts can be predefined by financial experts to make them useful to novice investors. Examples of alerts include: (1) a new 52-week high has been=20 reached for a stock; (2) a stock has recently split; or (3) Morningstar has recently increased its rating for a mutual fund. Alerts may also combine raw data with other information (e.g., the P/E ratio for a stock recently exceeded the industry average for that stock's industry). Other variations are of course possible. Information can be updated on a daily basis, such that alerts may change from day to day.

Alerts can be generated automatically by a computer, such that a preformatted message containing quantitative information of interest pertaining to a single investment is provided to the user. For example, the following preformatted text messages could be used to indicate the existence of a particular condition:

"The current quarter earnings estimate for XXXX has increased."

"XXXX announced that its stock will split YYYY on ZZZZ."

In each of the above examples, the letters XXXX, YYYY and ZZZZ would be replaced by a computer to insert a company name, a split ratio, and a date respectively. The user need not understand what parameters are being tracked, how frequently they are being tracked, and need not understand how changes to those parameters would constitute a significant event. Additionally, because the alerts can be pre-computed on a periodic basis and stored in a database, the information regarding a particular investment can be provided quickly, typically with little or no on-line processing delay (i.e., calculations need not be done at the time the user requests the information).

In accordance with various aspects of the invention, one or more computers receive and process multiple data feeds including quantitative and non-quantitative information to extract information relating to each type of investment. The processed data is compared to "alert rules" or triggers each corresponding to a predefined condition, and a truth table is established that identifies triggers that are true for each particular investment. When an investor selects a particular investment, he or she is shown all of the alerts that are true for that investment. The investor can choose to see more information in the form of a detailed explanation of the alert, possible interpretations of the data, or the like.

In certain embodiments, the alerts are predefined by financial experts who suggest how the data can be interpreted in a manner that reflects certain common situations in the world of stocks and funds. In some cases, the interpreted data can be linked to raw data or graphs, along with an in-depth explanation describing the interpretation and suggesting common next steps that the investor might want to take.

Triggers can also be created to indicate membership in a set of stocks, such as "This stock is one of the top 10 stocks that meet a certain criteria." Such a trigger could be used to compare stocks to one another and find the "best" stock meeting a certain set of criteria.

BRIEF DESCRIPTION OF THE DRAWINGS

FIG. 8 shows another footnoted type display 801 where alert indicators 802 and 803 are each associated with an investment.

FIG. 9A shows a first exemplary group of triggers corresponding to alerts that can be generated for investments.

FIG. 9B shows a second group of triggers corresponding to alerts that can be generated for investments.

DETAILED DESCRIPTION OF THE INVENTION

Figure 1:
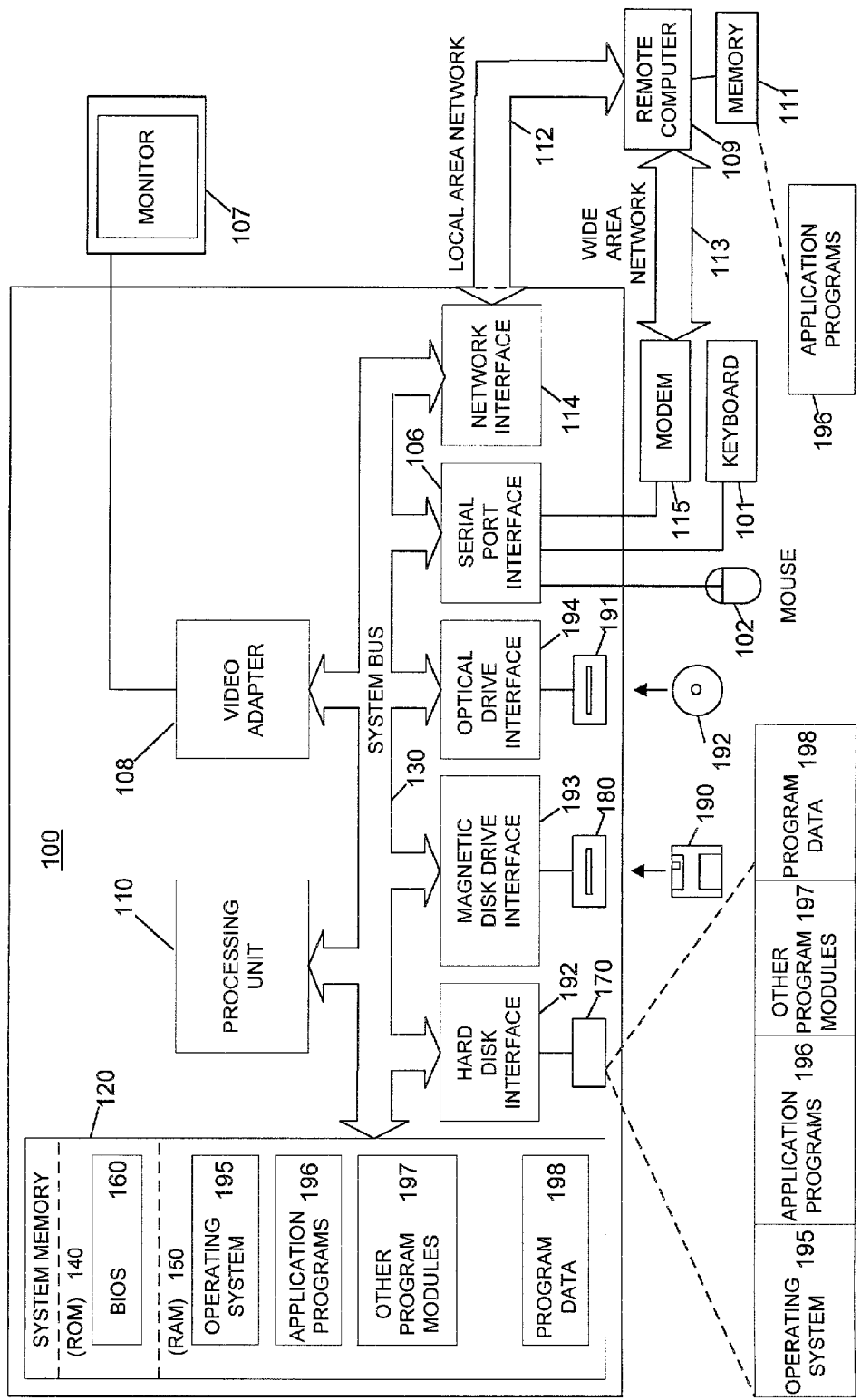
FIG. 1 shows a conventional general-purpose computing environment that can be employed in various embodiments of the invention.

FIG. 1 is a schematic diagram of a conventional general-purpose digital computing environment that can be used to implement various aspects of the invention. Computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory includes read only memory (ROM) 140 and random access memory (RAM) 150.

A basic input/output system 160 (BIOS), containing the basic routines that help to transfer information between elements within the computer 100, such as during start-up, is stored in ROM 140. Computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules can be stored on the hard disk, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner, or the like. These and other input devices are often connected to the processing unit 110 through a serial port interface 106 that is coupled to the system bus, but may be connected by other interfaces, such as a parallel port, game port or a universal serial bus (USB). A monitor 107 or other type of display device is also connected to the system bus 130 via an interface, such as a video adapter 108. In addition to the monitor, personal computers typically include other peripheral output devices (not shown), such as speakers and printers.

The computer 100 can operate in a networked environment using logical connections to one or more remote computers, such as a remote computer 109. Remote computer 109 can be a server, a router, a network PC, a peer device or other common network node, and typically includes many or all of the elements described above relative to computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are exemplary and other means of establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 2:
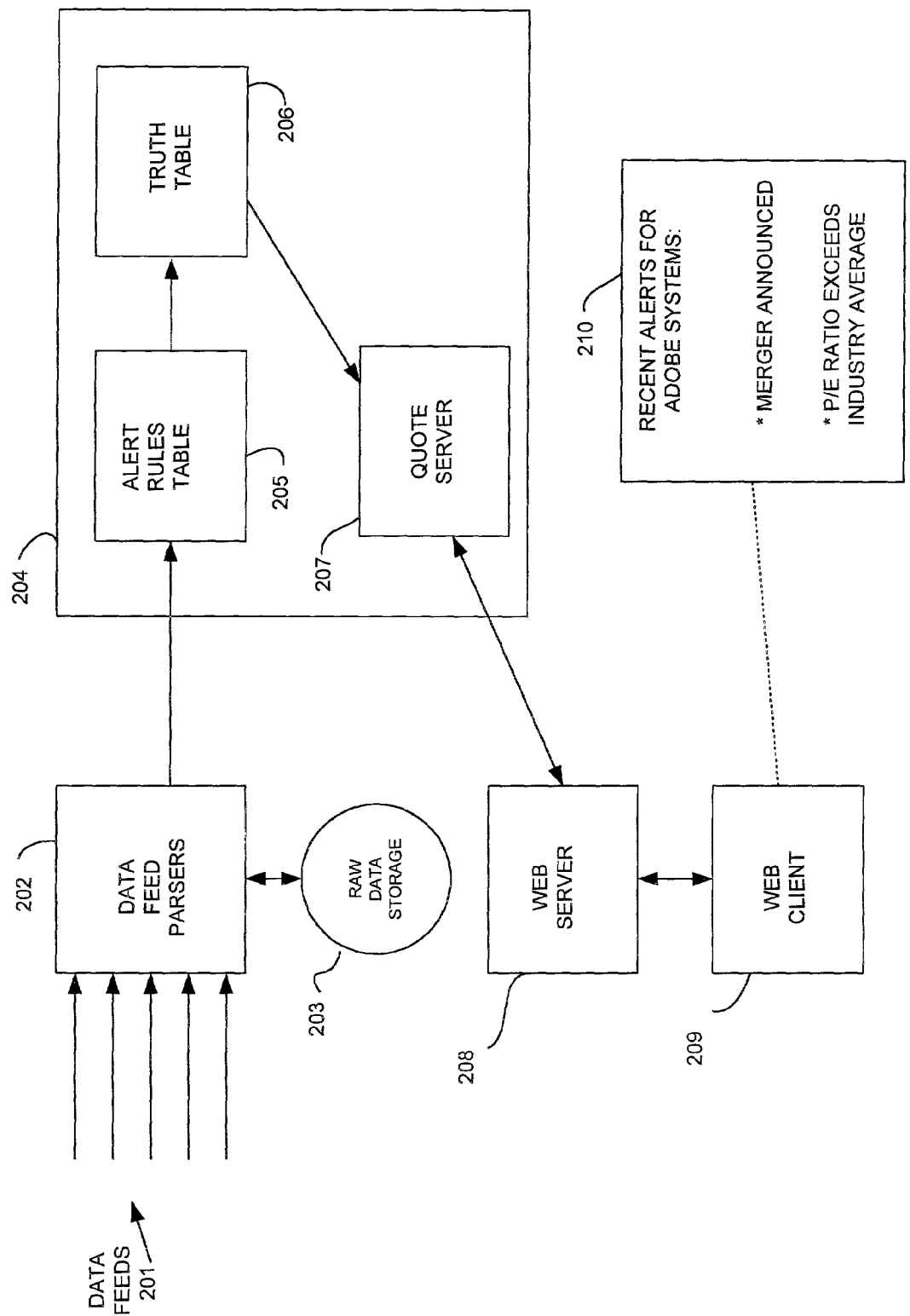
FIG. 2 shows a web-based distributed system employing various principles of the present invention.

FIG. 2 shows a web-based distributed system employing various principles of the present invention. As shown in FIG. 2, a plurality of data feeds 201 arrives at a computer 202 by any of various methods, such as CD-ROM, satellite, dial-up modem, Internet, and the like. In general, the data feeds include information concerning investments such as stocks, mutual funds, real estate investment trusts, foreign securities, bonds, etc. Information regarding each investment such as share prices, P/E ratios, bond ratings, and the like are embedded in the data streams and associated with each investment. In addition to external data feeds, internal sources such as human investment analysts and editors can create new content, which can then be stored and processed similarly to the data feeds.

Computer 202 includes data feed parsers that extract information from formatted and unformatted data feeds 201 and store the extracted information into a raw data storage area 203. The structure of the data feeds is well known and publicly available. Some of the data feeds that can be used as information sources include commercial and government sources such as:

(1) Media General
(2) Morningstar
(3) Comstock (4) EDGAR (i.e., from the Securities and Exchange Commission)
(5) Investor Editorial
(6) News (Reuters, PRNews, Businesswire)
(7) Briefing.com
(8) Zacks
(9) NetEarnings
(10) CSI.

Many of these sources include parameterized data fields for quantities such as share prices, PIE ratios and the like, wherein the parameters are associated with a particular stock or other investment. These values can be readily parsed, extracted and stored. Non-quantitative information such as news stories regarding a particular company can also be extracted and stored in database 203. Such non-quantitative information could include keywords such as "earnings" or "stock split" that are associated with a particular investment and would be of general interest to investors.

Some data feeds can be provided on a daily basis, while others may be provided less frequently. In general, dates are associated with each piece of information so that the timeliness of the data can be evaluated. If dates are not available in a data feed, the date that the information was received in computer 202 can be used. It will be appreciated that the parsing of data feeds can be performed in separate computers instead of a single computer as shown in FIG. 2 without departing from the scope and spirit of the claimed invention. The extracted data fields are compared to alert rules 205 stored in a table in computer 204. Alternatively, these rules can be maintained in computer 202, the location and allocation of functions and data among computers being immaterial to the principles of the invention. In general, alert rules define conditions that may be true for each type of investment, and may include time constraints and cross-correlations among parameters received from data feeds 201. For example, a rule can be fired upon detecting that the P/E ratio for a particular company exceeds the industry average P/E for all other companies in that particular industry. Further details concerning the definition and operation of alert rules are provided below. The terms "rule," "alert rule," and "trigger" generally are used interchangeably in this specification. The term "alert" will be used generally to refer to a fired alert rule or trigger, or a data structure for storing the fact that a trigger has fired.

The extracted quantitative (e.g., numeric) data and non-quantitative (e.g., news stories, advisor comments) data are compared to the alert rules and, for each investment, a record is made of those rules that have fired. The resulting information can be stored in truth table 206, which may comprise any data structure that stores this information. In one embodiment, the alert rules are compared at the time that new data is received via data feeds 201, such that truth table 206 is updated during the data processing period, avoiding the need to evaluate rules in real time when an investor requests information.

Triggers can also be created to indicate membership in a set of stocks, such as "This stock is one of the top 10 stocks that meet X", where X is a certain criterion. Such triggers can be used to compare stocks to one another and find the "best" stock meeting a certain set of criteria. Triggers that consist of sets of stocks or funds that have been chosen by applying certain criteria can also be sorted as to importance. For example, if a criterion of P/E<40 is defined, then all stocks meeting that criterion could be placed into a group. The members of the group could then be sorted in order (e.g., from lowest to highest), and membership in that group could be indicated by firing a trigger (e.g., "This stock is one of the top two stocks whose P/E ratio is less than 40").

An investor logs onto a web server 208 from a client computer 209 and, by entering information through a web browser, specifies an investment of interest. Upon specifying the investment by entering a company name or stock symbol, web server 208 issues a request to quote server 207, which fetches from truth table 206 a list of all rules that have fired for that particular investment. The fired rules can be displayed on a web page 210 at the web client computer 209 as alerts. It should be understood that although separate computers are shown in FIG. 2 for performing various functions and storing data, these functions and data can be combined into a single computer or split up differently from that illustrated. Computer software to implement the present invention can be programmed in any of various languages such as C, C++, or Visual Basic.

Figure 3:
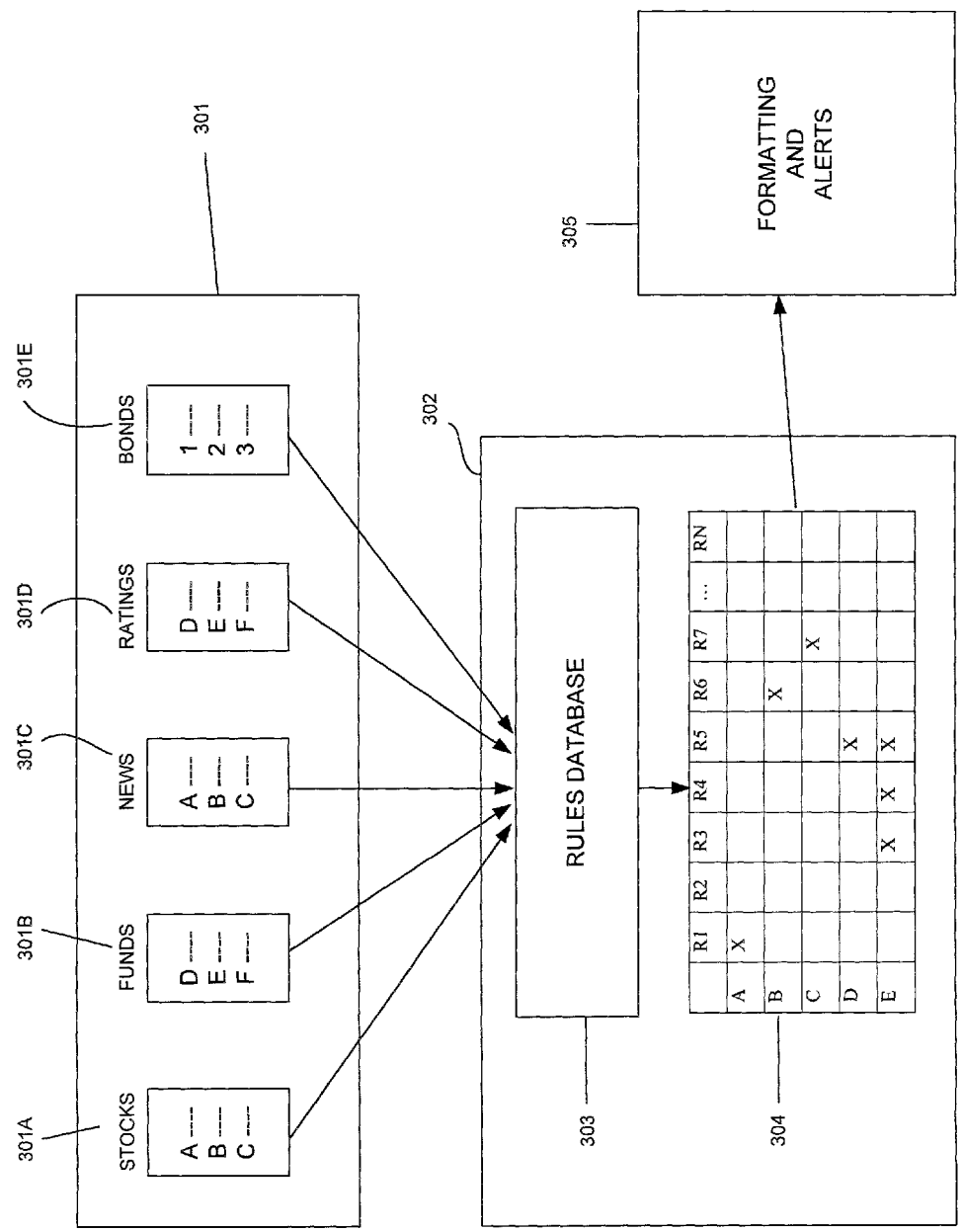
FIG. 3 illustrates how data from multiple data sources can be parsed and fed through a rules database to create a truth table 304 used for generating a web page 305.

FIG. 3 illustrates schematically how data from multiple data sources can be parsed and fed through a rules database to create a truth table 304 used for generating a web page 305. As shown in FIG. 3, a plurality of data sources 301 include sources that report information regarding stocks 301A, mutual funds 301B, news 301C, ratings 301D, and bonds 301E. These data sources generate data feeds that can be parsed according to their well-known formats to extract data fields of interest. Examples of such fields include stock prices, dividends, Morningstar ratings, SEC filings, analyst earnings estimates, news articles, in-house editorial content, historical information, and fundamental data such as P/E ratios. An alert database 302 includes a rules database 303 and a truth table 304. The parsed data items are compared to each rule (or "trigger") in rules database 303 to determine whether the tested condition has been met. A number of different alert rules can be created by financial and software experts. Some may involve very simple calculations, such as "has a new 52-week high," for which only one field of data must be checked. Others, such as "near low with positive momentum," combine several pieces of data and make mathematical and logical calculations on the data before determining that the situation has occurred. Examples of rules appear in FIGS. 9A and 9B, and are discussed in more detail herein.

Figure 4:
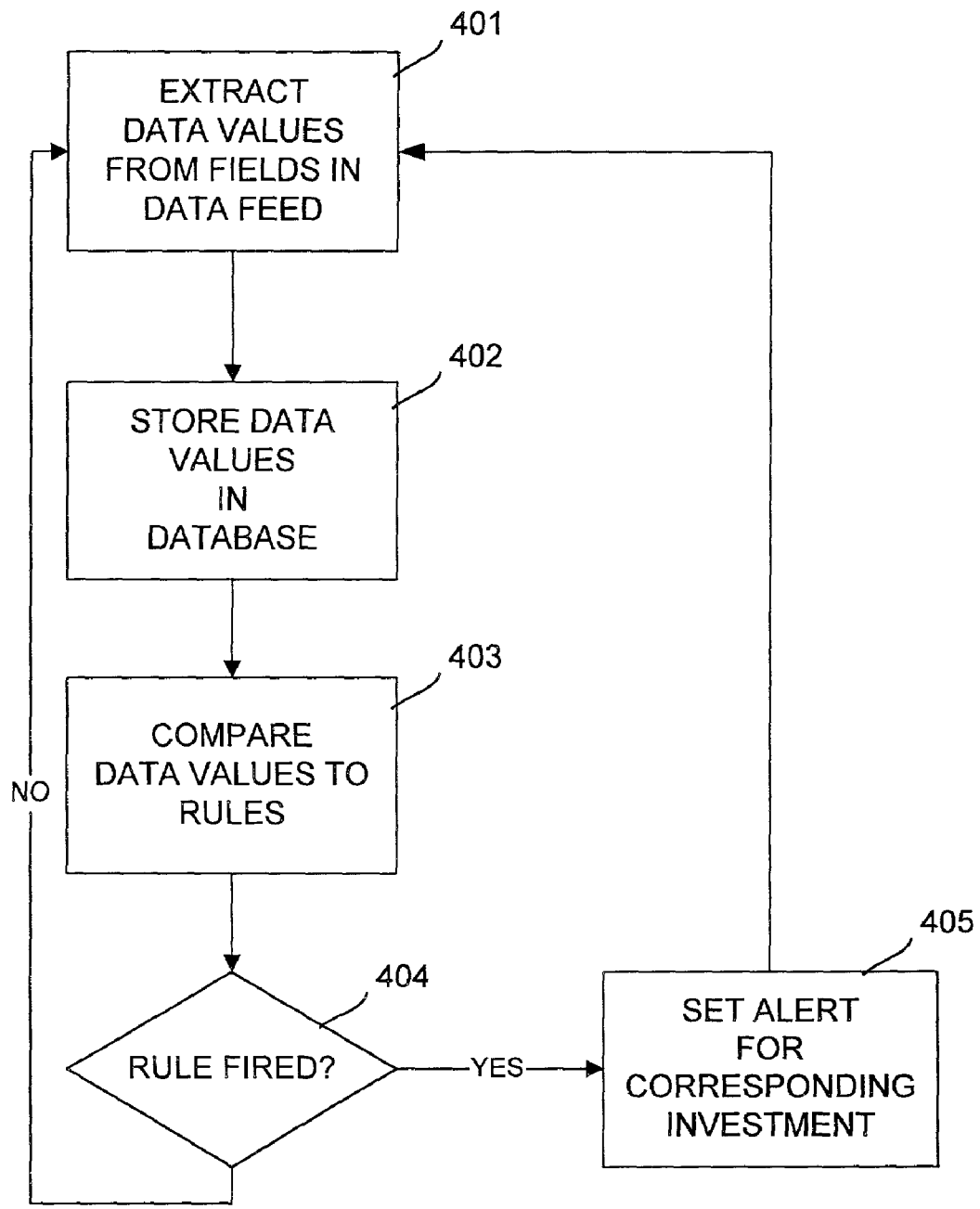
FIG. 4 shows steps that can be performed to process data feeds and set alert flags in accordance with one aspect of the present invention.

FIG. 4 shows steps that can be executed to process information from each of the plurality of data feeds 201 and to generate alerts in accordance with one aspect of the invention. In step 401, data values are extracted from fields in one of the plurality of data feeds. In step 402, the extracted data values are stored in the database. Data fields can be associated with "tickers," which are unique abbreviated names for stocks, mutual funds, and other investments.

In step 403, each extracted data value is compared to the rules stored in the rules database. Execution of the rules may include subsidiary steps of computing a value (e.g., percentage increase in price); comparing one or more values to a fixed quantity (e.g., comparing a price increase to a fixed percentage); or comparing an extracted data value to a plurality of previously stored data values (e.g., comparing the P/E ratio to an industry average for the industry to which the stock belongs).

For each rule that fires, a corresponding alert flag is set for the investment to which the data value pertains (step 405). Processing then returns to step 401, where data values from the next data feed are extracted. Higher level rules can also be run to filter stocks against these same values, and then sort the results. Additional triggers can be fired for each stock that is in the top N stocks in the set that is found.

It will be appreciated that the steps of FIG. 4 can be rearranged to suit various design objectives. For example, it may be desirable to parse and extract all data from data feeds during one time period (e.g., during the day) and perform the rules execution process from the stored data during another time period (e.g., at night). Other variations are of course possible without departing from the scope of the invention.

After executing the steps shown in FIG. 4, alerts that are true can be displayed upon request by an investor. Each alert can be correlated with display commands indicating what colors to use, what formats to display the data in, raw data to which the alert will be linked, and hyperlinks for the investor to learn more about the alert). The data can be displayed on a web page using conventional HTML and Active Server Pages.

As explained in more detail below, alerts can be configured to expire after a certain time period (e.g., one day, one quarter, one year, etc.). In order to implement such an expiration scheme, background software not explicitly shown in FIG. 4 can be executed on a regular basis to change the status of alerts that have been previously fired.

Figure 5:
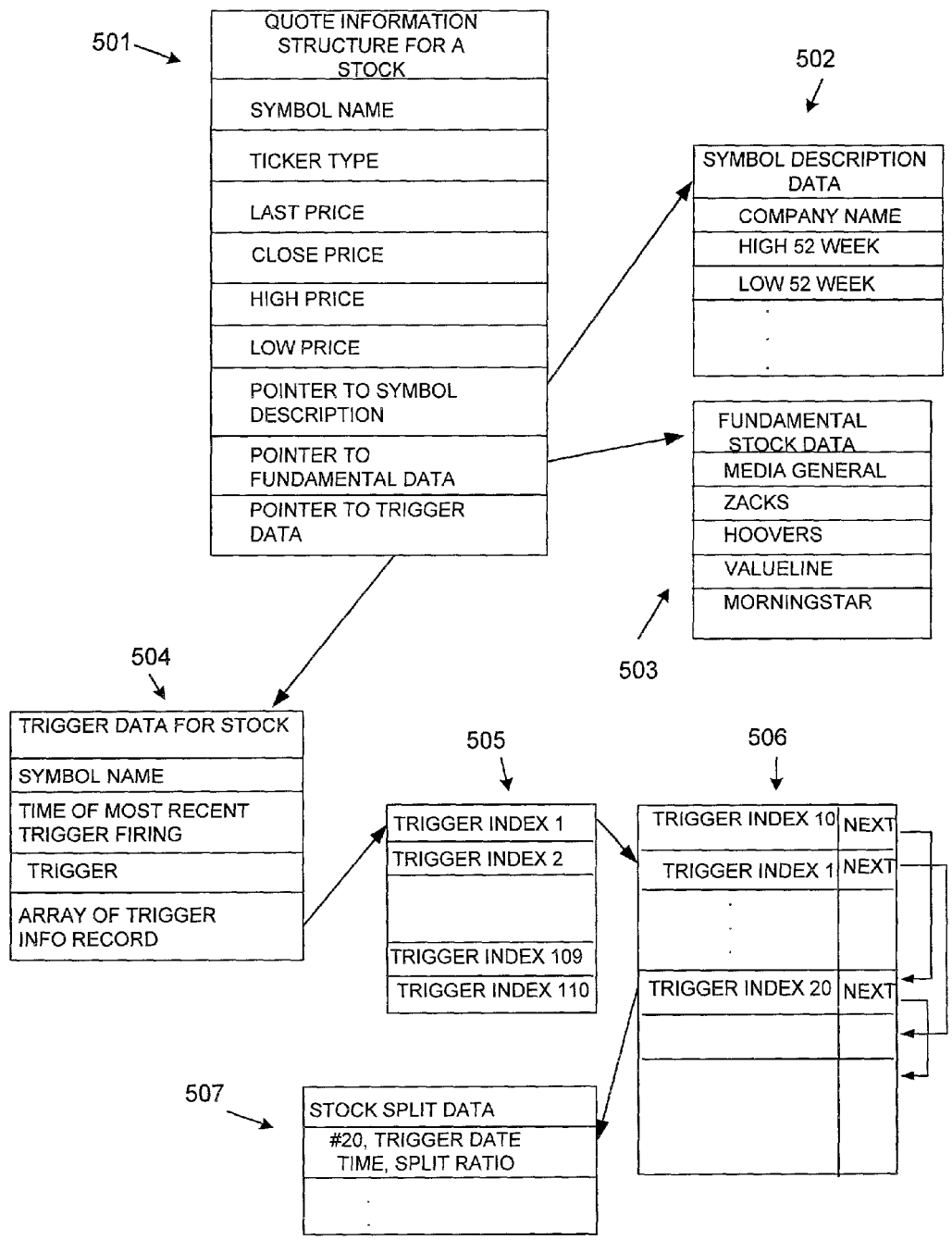
FIG. 5 shows one possible arrangement of data structures to quickly process information regarding triggers.

FIG. 5 shows one possible arrangement of data structures to quickly look up information regarding triggers. In one embodiment, quote server 207 (FIG. 2) maintains an array of binary tree structures for each country code (e.g., United States, Canada, etc.), and each such array per country is further indexed by ticker type (e.g., equity, bond, futures, foreign exchange, etc). The binary trees are indexed by stock ticker (symbol name) and are essentially a sorted list of quote information structures.

As shown in FIG. 5, each quote information structure 501 contains information about the investment such as symbol name, ticker type, price information (e.g., last price, close price, time of trade, high, low, etc.). Each such quote information structure includes a pointer to a symbol description record 502, a fundamental data record 503, and a trigger data record 504. Symbol description record 502 contains information about the stock (e.g., 52 week high and low, company name, etc.). Fundamental data record 503 contains all the information pertaining to that stock as received from various data feed sources such as Media General, Zacks, Hoovers, and others.

Trigger data record 504 contains trigger information for a specific investment including the symbol name for the stock, the time of the most recent trigger firing, and an array of trigger information records 505, one for each of the triggers. Each trigger information record includes an index into a trigger database 506 for the trigger corresponding to that index for that ticker.

Trigger database 506 can be implemented as an array of records wherein each record stores a pointer to the next trigger of that category in the trigger database for a particular ticker. For triggers where custom information is to be displayed (e.g., a stock split ratio, the headline of an article in which the stock was mentioned, or an analyst comment on the stock), software stores in the record an index into the record for that stock in a custom database 507 for the specific trigger. The software uses this index to locate the corresponding record in custom database 507. For the custom trigger info, this index in 506 locates the data record corresponding to that trigger for that ticker in custom database 507.

A record in the trigger history database 506 consists of two fields: (1) either the date and time that the trigger fired or an index into a location in custom database 507 (e.g., for stock split information, investor article information, analyst comment information, etc.); and (2) an index in the trigger history database to the next trigger in that category for that ticker. The first one in the list is the most recently fired trigger. The chain of triggers need only be as long as the history length specified for that trigger.

The data structures can be traversed as follows. When quote server 207 (FIG. 2) is queried to return all triggers that have been fired for a particular ticker symbol, the quote information structure 501 for that symbol is located by traversing a binary tree structure that keeps these records for all ticker symbols in a sorted manner. From the quote information structure record 501, the trigger data for that ticker (504) is located using a pointer. From record 504, the set of records for all triggers for the ticker is located in trigger database 505, which stores records for each trigger for every ticker symbol. Each record contains an index to a record in 506 containing most of the information pertaining to the trigger.

A record in 506 may contain either the date of firing for that trigger (for "standard" type triggers), or an index to a record in custom trigger database in 507. Additionally, a record in 506 contains a pointer to the next trigger in the history-chain for that ticker for that trigger. Based on the trigger number, it can be determined whether a standard or custom trigger, so that it can be determined whether the "fired" date should be retrieved from the record or whether the index should be followed to locate the record in 507. A standard trigger is one in which no custom data is shown in the trigger text (price, P/E ratio, etc.). If the trigger has custom data, the index from 506 can be used to locate the record containing information on that trigger for that ticker in 507. A record in custom database 507 can store the trigger firing date, followed by additional fields specific to that trigger source. For example, a stock split trigger database can store pre-split and post-split numbers in that record. Custom database 507 can be used to store information regarding stock split announcements, analyst ratings, symbol name changes, or investor editorial articles. As explained previously, background software can traverse the various data structures to disable certain types of triggers after a predetermined expiration date.

Figure 6:
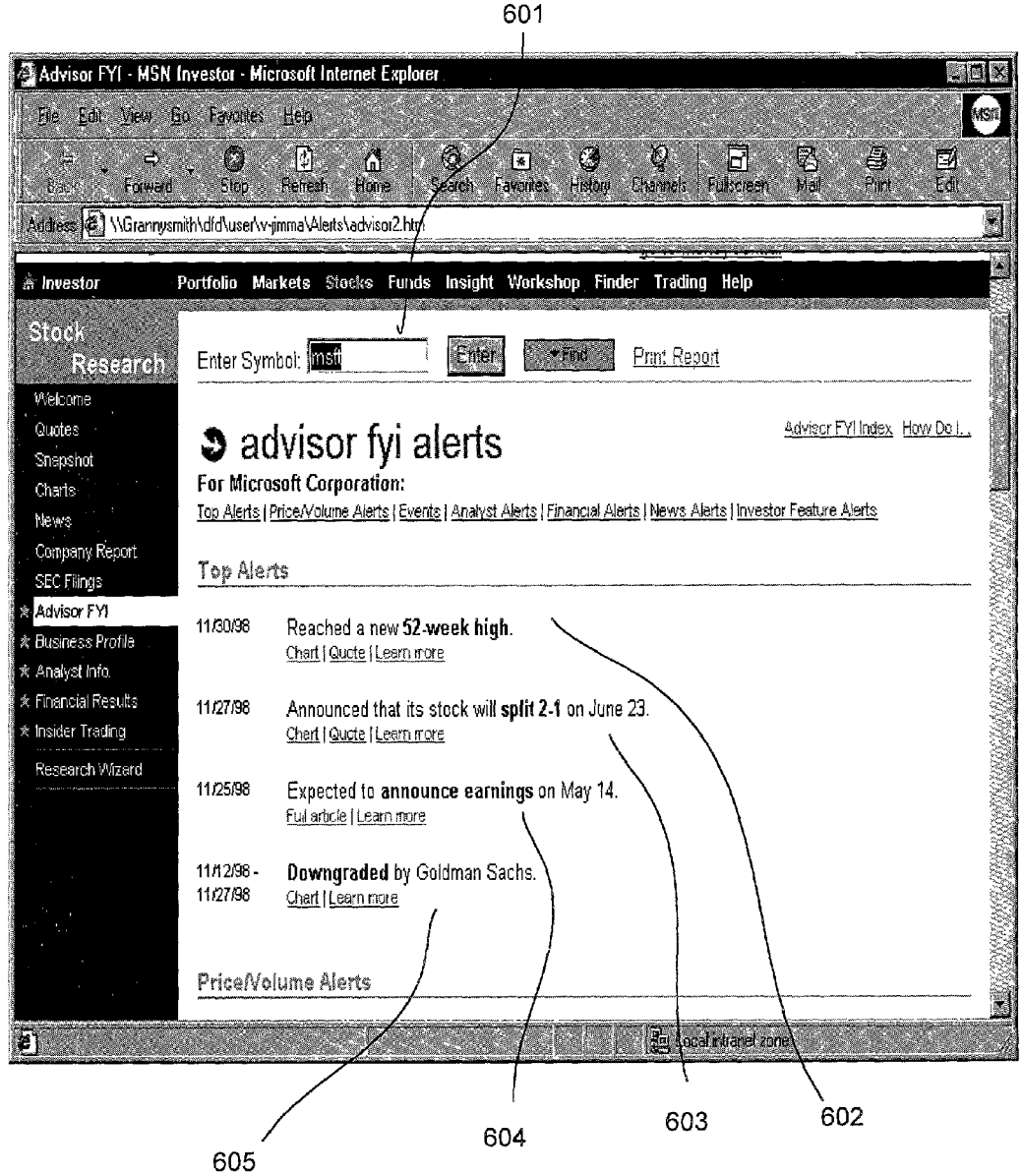
FIG. 6 illustrates one possible graphical user interface for presenting alert information to a user in accordance with the principles of the invention.

FIG. 6 shows one possible user interface, implemented as a web page, for displaying alert information. As shown in FIG. 6, a user navigates to a web site, handled by a web server such as web server 208 of FIG. 2, and enters a stock symbol "msft" (for Microsoft) in the form field 601. In response, web server 208 obtains the alerts that are true for that investment and displays four alerts 602 through 605. As shown in FIG. 6, these alerts are displayed with dates to their left to indicate when the alert was generated. Examples include 602 ("Reached a new 52-week high"); 603 ("Announced that its stock will split 2-1 on June 23"); 604 ("Expected to announce earnings on May 14"); and 605 ("Downgraded by Goldman Sachs"). As explained in more detail below, alerts 602 through 605 appear under the heading "Top Alerts," a category intended to draw more attention to time-sensitive alerts. Other alerts can be categorized under different headings in order to simplify the presentation of information to the investor.

The alerts in FIG. 6 have associated hyperlinks underneath each alert, providing a way for the investor to learn more information about the alert. For example, three hyperlinks associated with alert 602 are Chart (i.e., show a graph of the stock price); Quote (i.e., find the current selling price); and Learn More (i.e., display a more detailed explanation of what this alert represents). Alert 604, however, has different hyperlinks (Full Article instead of Chart and Quote), representing different information specific to that alert. The exemplary display format shown in FIG. 6 is only one of myriad ways of displaying alert information to an investor. Although the display of FIG. 6 relies on a web browser to retrieve and display information, other approaches are of course possible.

In general, when an investor identifies an investment on a web page according to various aspects of the invention, software retrieves and displays all alerts that are currently and recently true for that investment. The user sees a display listing alerts that have fired, preferably grouped by categories. Categorizing alerts can help users recognize alerts that are of the most interest. For example, some users will have more interest in price or technical analysis based alerts, while others may be interested in financial fundamentals. In one embodiment, the alerts can be broken down into the following categories: Top Alerts, News Alerts, and Research Alerts.

Top Alerts represent the most timely and relevant alerts and can be displayed at the top of the page. In one embodiment, Top Alerts can appear for 48 hours after firing, after which they will be moved to their regular category displayed below the Top Alerts display area. In addition to time limits on Top Alerts, an alert can be made to expire according to a predefined expiration date after it is moved to its regular category. News Alerts represent information appearing in published materials concerning an investment. Research alerts indicate specific financial information that is more likely to be understood by sophisticated investors. For example, "The price-earnings (P/E) ratio for MSFT has been greater than two times its average next year's projected earnings growth rate. For small and mid-cap stocks in particular, this is generally considered as a sign that a company may be overvalued."

Alerts may include a date indicator within the preformatted alert text (e.g., "On Dec. 23, 1998 Microsoft reached a new high of $142.88"). Alternatively, dates can be displayed in a column to the left of the alerts.

In another embodiment, alerts can be categorized into six categories: (1) Events (e.g., corporate actions such as splits, dividends, name changes, etc.); (2) Price/Volume (time sensitive alerts that expire after a short period of time); (3) Analyst (anything that has been interpreted by an analyst); (4) News (general news stories); (5) Financial (the largest group; due to data updates and the nature of this content, these alerts are less timely and require a deeper understanding of finance by the user); and (6) Investor Features (articles, pre-configured screens).

In order to avoid inundating an investor with alerts, it may be desirable to limit the number of alerts for a given stock at any one time to somewhere between 3 and 10 alerts. Additionally, it may be desirable to limit new alerts to about one per week per investment in order to avoid losing the impact effect of an alert. Alerts should be selected and displayed in a manner that makes them concise, clear, and easily understandable.

If alerts are combined with a portfolio manager application, they can be displayed for all investments in the investor's portfolio. After an investor views an alert, it can be disabled or diminished for that investor (for example, by changing a color indicator or turning off a "light bulb" indicator on the web page) so as not to bother the investor again until the alert fires again at a later date.

Many different mechanisms can be used to fire alerts. For example, when a news article appears that mentions particular stock, an alert can be fired to alert investors to that fact. Alerts can also be generated from quantitative data generated in quote server 207. In general, each alert can include one or more associated mathematical or logical computations that are executed to determine whether the alert is true or false. (For example: X and Y are true but Z must be not true). If a given alert equation evaluates to true, that alert will be "activated" and the alert message generated by populating a preformatted message with the particularized information and placed onto an alert queue. When the equation evaluates as false, the alert is disabled. An example of an alert equation might be "[Last]>[52 Wk Avg Price]". The corresponding preformatted message could be something like "This security has just broken through its 52 week average of [52 wk Avg Price] with a value of [Last]".

News arrives from Reuters, PRNewsWire, and BusinessWire with several tags that identify the type of news that it is. Software can identify certain key tags (e.g., earnings estimates) and turn these news items into alerts. News alerts can include the headline of the article that caused them to be true. Rather than jumping directly to the news article, clicking on a news alert can be implemented to display topical news, permitting the user to scroll through a list to find the article. For example, if there is an alert for "Merger or Acquisition announcement," and there are four such announcements for a particular company over a time period of a week, it may be desirable to display only the first such announcement, and provide a way of displaying the other announcements. This avoids cluttering up the display.

Some alerts can be fired when new EDGAR documents show up from an EDGAR data source. (EDGAR documents reflect corporate filings at the Securities and Exchange Commission). Triggers can be created to correspond to specific or categorized documents that have been filed with the SEC. For example, one alert can be created that states that "An important unscheduled material event or corporate change has been filed with the SEC" that fires if any 6-K, 6-K/A, 8-K, or 8-K/A forms are filed. Such alerts can also be linked to the disclosure document filed with the SEC to allow investors to read the actual document.

It may be desirable to adjust the time that alerts are deemed to be "fired." For example, data from Media General may arrive late Monday night or early Tuesday morning. For data received from midnight to 3 pm eastern time, the data can be branded from the previous day and that previous day can be used as the firing date of the triggers. If the data comes in from 3 pm eastern time to midnight, the current date can be used as the firing date of the triggers. Other adjustments can be made to account for market hours or business days (e.g., many markets are open from 9 a.m. to 4:30 p.m. Eastern time, on a five day week).

For certain types of alerts, two separate messages can be used, an "active" message and a "disabled" message. This is because the tense of the verbs may be different. When an alert is active, the message can state that "The P/E for this stock is . . . " When it is disabled, the message can state that "The PE for this stock was . . . "

It may be desirable to exclude data in an alert message that isn't already being displayed on the web page, in order to avoid multiple calls to the quote server and thus improving performance. It may also be desirable to provide a list to the user of all alerts, and allow the user to click on any alert for more information.

Different types of alerts can be defined, as follows:

Active Condition Alert: an alert having a start date with no end date yet and uses the Active Message so that the verbs are all in the present tense. Two examples are:

"Since XX/XX/XX: The PE of Microsoft Corporation has been above its 3-year average. This may mean that the stock is currently overvalued or that there is a big new product about to be released." "Since XX/XX/XX: The price of Intel Corporation has been within 10% of 52-week low with a positive price momentum. This is usually considered to be a bullish indicator since it means that bargain hunters are buying it and pushing the price back up."

Disabled Condition Alert: shows a range of dates when the alert was true, and uses the disabled message so that the verbs are all in the past tense. For example:

"From XX/XX/XX to YY/YY/YY: The PE of Microsoft Corporation was above its 3-year average. This may mean that the stock was overvalued or that there was a big new product about to be released."

Event Alert: have only a date when they occurred, so they start with "On XX/XX/XX". For example:

"On XX/XX/XX: Microsoft Corporation broke through its 52 week high of ZZ with a price of YY."

Precondition Alerts: alerts that turned on the day that they began to be tracked. To indicate that this condition may have been occurring before tracking started, the system can show alerts that were activated on the first day (e.g., "As of at least XXX, the stock had hit its highest point.")

Active Precondition Alerts (note that the date below is yesterday's date for ongoing triggers since the disabled date is the date that a trigger stopped being true):

"As recently as YY/YY/YY: The PE of Microsoft Corporation has been above its 3-year average. This may mean that the stock was overvalued or that there was a big new product about to be released."

Disabled Precondition Alerts (note that the system can show one day before the disabled day as the date below for ongoing triggers since the disabled date is the date that an alert stopped being true):

"As recently as YY/YY/YY: the P/E of Microsoft Corporation was above its 3-year average. This may mean that the stock was overvalued or that there was a big new product about to be released."

Alerts for multiple investments can be displayed by simply repeating the page layout over and over. For example:

Alerts for Intel

. . .

. . .

Alerts for Microsoft

. . .

. . .

Figure 7:
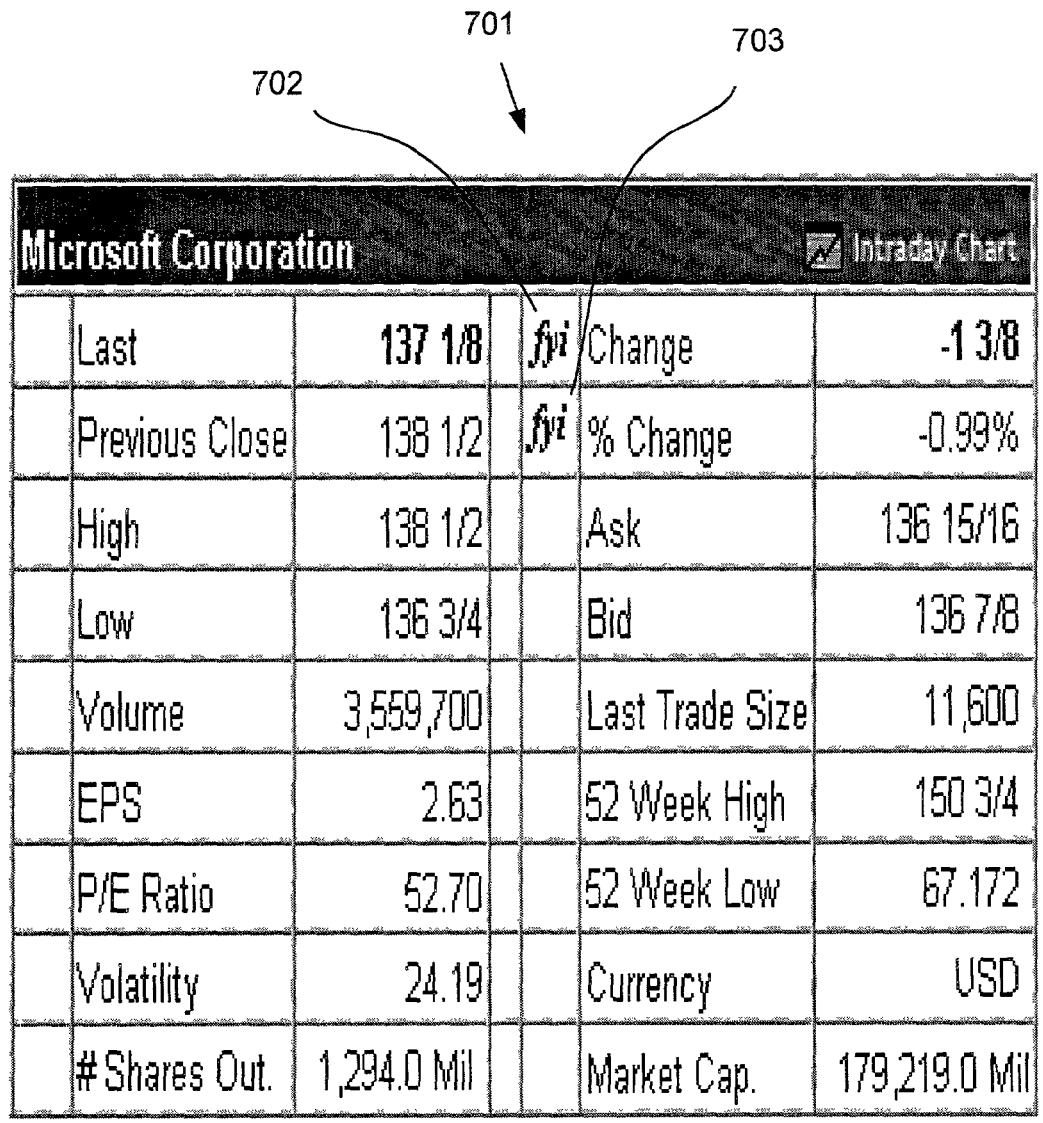
FIG. 7 shows how alerts can be flagged as footnote-type indicators 702 and 703 on quantitative data displays.

In addition to displaying alerts in response to an investor-specified investment, alerts can be flagged as footnote-type indicators on other displays. Turning to FIG. 7, for example, a table 701 displays certain investment-related information for Microsoft Corporation, which was previously selected by an investor. In addition to displaying certain current quantitative information for this investment, two alert indicators 702 and 703 are positioned to the left of two of the parameters and highlighted using a different color on the display. These alert indicators alert the investor that these two parameters (i.e., price change and % change in price) caused certain alerts to fire, and they invite the investor to find out more information by clicking on either alert indicator 702 or 703. Upon clicking on one of these alert indicators, the user would be presented with alert information as explained above. This "footnote" feature can be provided on any of various investment related displays.

FIG. 8 shows another footnoted type display 801 in which an investor has requested price quotes for two securities (Microsoft and Dell Computer Corporation). Because the two securities each have active alerts, alert indicators 802 and 803 are highlighted to the left of each row corresponding to the security. Clicking on either alert indicator would cause a display of the corresponding alerts to be generated. In this manner, the investor is provided with easy-to-use information without being inundated on a single display. Other variations are of course possible; for investors who have a portfolio of investments displayed in table form, those investments for which alerts are active can be displayed with alerts similar to those shown in FIG. 8.

There are many different ways of defining and storing alerts in the system. It may be desirable to define the following properties for each alert:

| Property | Description | Explanation |
| --- | --- | --- |
| Message | The message that is presented to the user about this alert. | This is what the user actually sees about the alert, e.g., "On XXXX date the P/E exceeded the industry average for this company's industry." |
| Disabled Message (ongoing alerts only) | The message that is presented to the user if the alert is disabled but still displayed | Because the tense of the sentence needs to be different - e.g. "From XX/XX/XX to YY/YY/YY The PE of Microsoft was above its three year average" |
| "See Also" Text (may be multiple of these) | At the end of the alert message, list of places to go for more information about the data the alert is discussing. "See Also Text" is the actual text that should be shown, e.g. "See Price History Chart" or "Read News Item." Every alert can include a "Learn More" entry at the end that links to a glossary entry that describes the alert itself. | |
| "See Also" Link (one of these for each "See Also Text") | The Href that gets used when the user clicks on the see also text above. | Users may want to see the information that fired this alert, for example, the article that wrote about it. Some alerts may need complicated HREFs, for example, any alerts that link to charts will have to describe the chart that should be shown, and may need to be parameterized based on the stock that is firing the alert. |
| Data Items for Footnotes (may be multiple) (data item for exclamation, and page) | Describes which data items in the quote server this alert is tied to. These data items can have an indicator show up in front of them in the pages where they appear, and the text of the alert will appear at the bottom of these pages. | |
| Event | True if this is an event alert | Display event alerts differently |
| Priority | High, Med, Low | (Useful for sorting by importance) |
| Industry Exceptions (may be multiple) | A list of industries that this alert doesn't make sense for. | Some alerts won't make sense for certain industries; avoid firing them on stocks in these industries |
| Short Name | Shows the short name of the alert to be used in the display. | Because the full description of the alert will be much too long to show in the display. |
| History Length (event alerts only) | How many items are retained for history. Can be a number of entries. | |
| When Fired | Whether this is fired daily, continuously, monthly etc. | |
| Remove "See Also" Links when Disabled | If true, the only see also link needed for the alert when it is disabled is the "learn more" link. | |

In order to avoid confusion, it may be desirable to have a history length no greater than three (i.e., maintain no more than three "running" values for each alert). In some cases, it may be desirable to use a history length of one. Each history value can also be created with a default time-out value of, for example, six months (180 days).

It may be possible to have seemingly contradictory alerts. For example, when a stock is hovering near its 52-week moving average price, it is possible that both "crossed above 52-week moving average" and "crossed below 52-week moving average" alerts will be true at the same time. (One case would be considered "bullish" and the other "bearish."). However, some stocks tend to hover around their 52-week moving average, crossing above and below repeatedly. Consequently, this situation can be detected (i.e., when contradictory alerts fire within a short period of time, such as a week) and be replaced by a new trigger that describes the situation (for example, "this stock is hovering near its 52-week moving average." This allows retention of two good triggers, and to more accurately analyze the situation based on the combination of existing triggers. Alternatively, the older case could be deleted and only the newer trigger shown.

Another potential problem may arise where dates appear to be out of order. For example, news alerts and all other alerts come from two completely different sources that know nothing of each other's existence. For example, if a news alert for a particular investment fires on June 2, an analyst comment is entered on June 3, and then another news alert fires on June 4, it may be difficult or impossible to order the alerts by date. In order to avoid the alerts appearing out of order, it may be desirable to break news alerts out into a separate group at the top of the page.

Another potential problem may exist where stocks split, causing an apparent (but misleading) decrease in dividends. Because stock split and dividend information may arrive from two different sources, this problem can be ameliorated by checking for both conditions at the same time (i.e., check for a dividend trigger firing at the same time as a stock split trigger). If that occurs, it may be preferable to report only the stock split trigger and suppress the dividend decrease trigger.

Another potential problem may arise from erroneous data supplied by the data feed sources. As one example, where an erroneous data item indicating that a stock's earnings fell short of estimates arrives, this error may not be detected for a long period of time. Upon correction, the trigger may not be automatically withdrawn since it had already been fired for that quarter. Checking upon firing of a trigger to determine whether the opposite trigger had recently fired can ameliorate this. If the opposite trigger had recently fired, it can be replaced with the new trigger rather than leaving the old (presumably erroneous) trigger in the "fired" state. Examples of "opposite" triggers include: Earnings Estimate Spread Increased/Decreased; Annual Revenue Growth Above/Below 5-Yr Average; Annual Earnings Growth Above/Below 5-Yr Average; Quarterly Revenue Growth Above/Below 5-Yr Average; Quarterly Earnings Growth Above/Below 5-Yr Average; Gross Profit Margin Increased/Decreased.

Each alert has a condition that it monitors. If the condition has never been true for an investment, the alert is said to be "unfired" for that investment. When the condition is true, the alert becomes active. If the alert is active and the condition becomes false, it becomes disabled. For example, if an alert monitors the condition "the P/E ratio for a stock is 10% above its 5 year average," then it will be:

(1) Active for any stocks for which this condition is true right now;

(2) Disabled for all stocks that have ever been in this state before; and (3) Unfired for all other stocks Each of the three states may be important for the user. Active alerts mark conditions that are true today, and should be reported to the user. Disabled alerts are events that have occurred in the past, and may still be useful to the user: "ABC was true about this stock a week ago." Unfired alerts are typically not shown to the user.

Some conditions can be true over a period of time. For example, "the fees have increased for a fund" don't really have a timeframe when they are "active" and then get "disabled;" they just happen at some time. These kinds of alerts can be handled differently since they really don't have a start and finish.

Fired alerts can be viewed as rows in a giant table (the "alert queue"), where each row in the table includes a column indicating:

(1) Which alert the row represents (2) Which stock it fired against (3) The date and time the alert was last activated (4) The date and time the alert was last disabled. This is empty or null if it is still active, and null if the alert is an event alert (since it really never gets disabled, it just fires). Certain investments may have alerts associated with them (e.g., U.S. equities, funds, indexes, and industries), while others may not.

The activation and disabled dates reflect an effort to display the time that the event occurred. For example, if data from Media General is received at 2:00 a.m., but the triggers rely on "market close" data, the trigger firing date can be set so as to appear to have fired the day before (i.e. before midnight). It may be desirable to ensure that as items are posted to the alert queue, they have monotonically increasing activation and disabled dates assigned to them. For example, if a new alert is posted, it should have a date later than the last alert posted for that investment; otherwise, the indicator light in the portfolio manager will not light up when new alerts come in with dates that are in the past.

It may also be desirable to display only the date that the triggers fired rather than a time, so that users are not misled into thinking that the time is actually the time that the trigger occurred in the real world.

If an alert is presently active, the "last disabled" field is empty. It is also empty if the alert is an event alert—since it really never gets disabled, it just fires. A special value can be designated as "this trigger went on the date the database was started" that the actual start date can be masked.

For condition alerts, the system can keep track of the date that an alert was last activated and disabled (i.e., rather than keeping an entire history of activations). This prevents the alert queue from growing endlessly, and also allows the keeping of important events in the queue for all time. Thus if there are M alerts and there are N securities, there will be a maximum of M×N alerts in the alert queue. The invention is not limited in this respect, however.

For event alerts, it may be desirable to keep a full history of the alerts. For some alerts, the length of the history is defined by time (i.e., keep news event alerts around until the news longer exists, such as 90 days), and can be defined as a specific number of alerts (e.g., only keep 10 alerts around at a time, with the old ones falling off the list). Each alert can be associated with a history parameter indicating how long the alert is kept. Event alerts by their nature seem to be the kinds of information for which a history is desirable, while condition alerts are less interesting to an investor from a history perspective. This may be because event alerts are more closely related to "news-type" information, and condition alerts are more related to quantitative information that quickly goes out of date. Some examples of event alerts for which history may be important include:

(1) stock buybacks
(2) 13D filings
(3) articles that have been written about the stock—not just the last one
(4) important news articles that have happened over the last X period of time
(5) how many times the company has shown an earnings surprise.

FIGS. 9A and 9B provide examples of various triggers that can be used in a system according to the present invention. As shown in FIG. 9A, for example, trigger 0 (near low with positive momentum) has an associated message that is displayed and populated with the particular investment when the calculation shows that the trigger has been fired. Other triggers are populated and displayed in a similar manner. Certain triggers can include compound conditions, while others may include only a simple quantitative calculation or comparison. In FIG. 9A, for example, trigger 0 requires a compound logical "AND" of four separate conditions, while trigger 4 requires only a single mathematical comparison. Moreover, certain triggers, such as trigger 1, involve non-quantitative conditions that are fired when a news report includes a particular type of information.

Thus has been described a system and method for providing investors with easy-to-use investment information regarding investments of interest to the investors. Many modifications and variations on the invention are of course possible, and the scope of the invention is defined only by the claims appended hereto.

The invention claimed is:

1. A computer-implemented method comprising:
   receiving, by a computer, a plurality of feeds of data each including information concerning one or more investments;
   parsing, by the computer, each of the plurality of feeds of data to extract at least one quantitative data item for each of the one or more investments;
   comparing, by the computer, each quantitative data item that was extracted to one or more triggers specified by an entity other than a user, each trigger comprising an association between a predefined criterion, specified by an entity other than the user, and one or more of the quantitative data items that were extracted and when the comparison indicates a match:
      updating a truth table to include the at least one quantitative data item; and
      forwarding, to a computer associated with the user, an alert for the trigger that corresponds to the criterion that matched; and
   causing the computer associated with the user to display the alert, that includes the at least one quantitative data item from the truth table, for an investment selected by the user on a screen associated with the computer.

2. A computer-implemented method comprising:
   receiving, by a computer, a plurality of feeds of data each feed of data including information associated with a plurality of investments;
   parsing, by the computer, each of the plurality of feeds of data to extract quantitative data items for each investment of the plurality of investments;
   comparing, by the computer, the quantitative data items with one or more alert rules that each define a condition that is associated with an alert;
   comparing, by the computer, each quantitative data item that was extracted to one or more triggers specified by an entity other than a user, each of the one or more triggers comprising an association between a predefined criterion, specified by an entity other than the user, and one of the extracted quantitative data items and, when the comparison indicates a match, setting an alert that corresponds to the trigger; and
   forwarding the alert for display on a screen for a computer associated with the user, the alert flagged for presentation as a footnote indicator for an investment selected by the user.

* * * * *